Dec. 25, 1962   R. J. DERKS   3,070,410
GREASE CHECK VALVE
Filed Aug. 9, 1960   2 Sheets-Sheet 1

INVENTOR.
Richard J. Derks
BY
Schramm, Kramer + Sturges

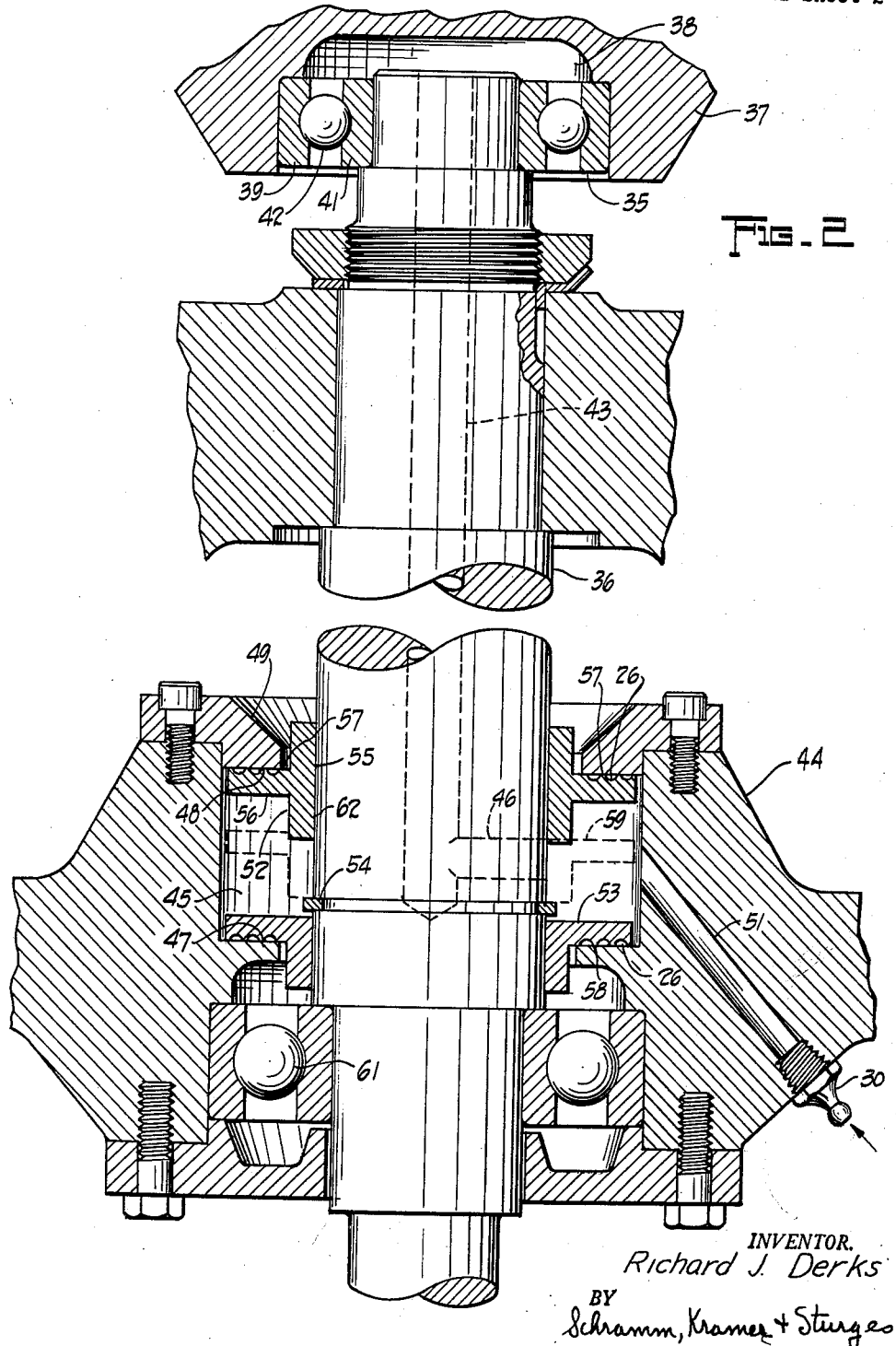

United States Patent Office 3,070,410
Patented Dec. 25, 1962

3,070,410
GREASE CHECK VALVE
Richard J. Derks, Kenosha, Wis., assignor to Eaton Manufacturing Company, Cleveland, Ohio, a corporation of Ohio
Filed Aug. 9, 1960, Ser. No. 48,530
11 Claims. (Cl. 308—134.1)

This application relates to grease check valves and lubricant retaining systems.

An object of the invention is to prevent bearings from running dry or having inadequate lubrication as a result of grease falling from the bearing, particularly in the case of vertical drives.

A further object of the invention is to provide an arrangement for lubrication of bearings while the journals are rotating in the case of either vertical or rotating drives.

A further object is to eliminate over greasing.

A more specific object is to maintain grease in inaccessible bearings.

Still another object of the invention is to provide an improved, inexpensive, sturdy, durable and reliable grease retaining system.

A further object of the invention is to provide grease sealing means having low frictional drag and wear, providing more positive sealing than heretofore available.

A further object of the invention is to provide a grease retaining system adaptable for either horizontal or vertical drives or for inversion of a vertical drive with the bearing either above or below the lubricant inlet port.

A further object is to provide a system of check valves for lubrication, which are free to float on a shaft with negligible friction at any intimate surfaces.

Other and further objects, features and advantages of the invention will become apparent as the description proceeds.

In carrying out the invention in accordance with a preferred form thereof, the bearing housing is formed with a recess to provide a grease admission or retaining cavity. Extending along a plane perpendicular to the axis of a journal or rotating shaft within or at the end of the grease cavity, a shoulder or ledge is formed and a check valve is provided in the form of a ring surrounding and fitting the journal axially slidable thereupon, having a surface or face adapted to lie along the surface of the shoulder or ledge for closing the grease retaining cavity upon movement of the check valve toward such ledge. Preferably the check valve is in the form of an annulus having L-shaped cross section with a cylindrical surface lying along the journal and an annular face adapted to lie along said ledge.

A better understanding of the invention will be afforded by the following detailed description considered in conjunction with the accompanying drawing, in which:

FIG. 2 is a view partially in cross-section of a vertical drive with a pilot bearing and grease supply and retaining means for the pilot bearing.

Like reference characters are utilized throughout the drawing to designate like parts.

Figure 1:
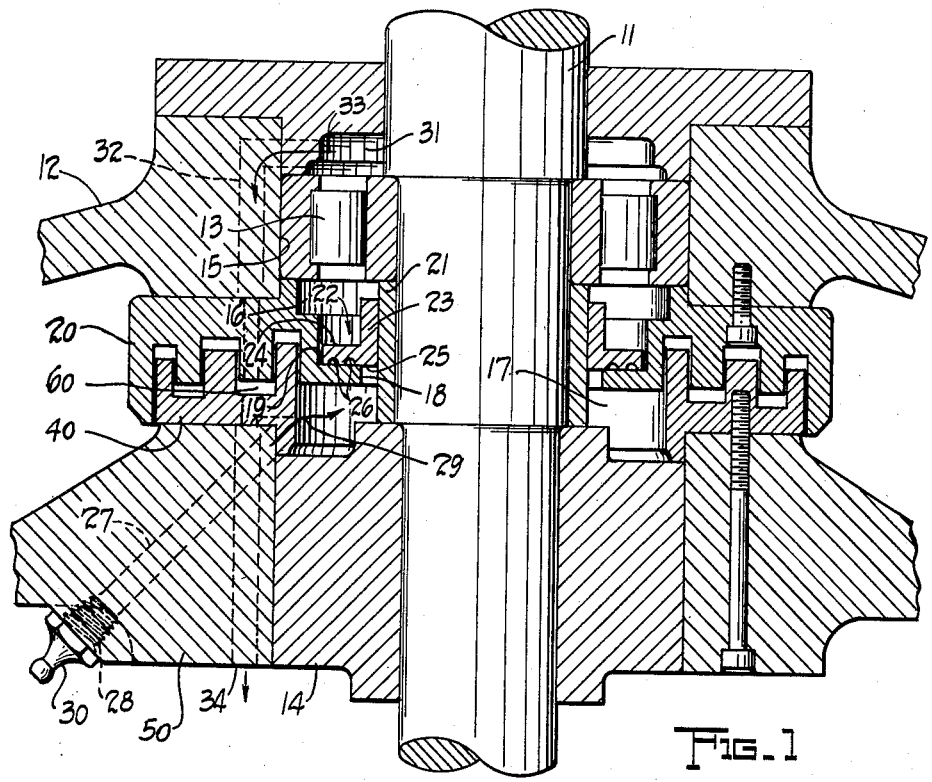
FIG. 1 is a fragmentary view of apparatus having a vertical drive showing partially in cross-section a bearing housing, a journal rotatably mounted therein by means of a roller bearing and grease retaining means for the roller bearing, together with grease relief means.

In the embodiment of FIG. 1 there is a continuously rotating vertical shaft 11. For supporting a drum (not shown) there is a drum support the webs of which have broken away. The drum support 12 and the shaft 11 are mounted relatively rotatable by means of a roller bearing 13. The drive is representative of drives used in electromagnetic eddy current devices and the like, for example, in which rotation is continuous and lubrication of inaccessible bearings must be accomplished during the rotation of the shaft 11. The present invention relates to means for lubricating and retaining grease in the relatively inaccessible bearing 13, although another bearing 14 for the shaft 11 to which the invention does not pertain is also shown diagrammatically for the sake of completeness of the illustration of the structure. A recess 15 is provided in the drum support 12 for receiving the roller bearing 13 which includes inner and outer races and conventional anti-friction rollers. An outer bearing cap 20 is secured to the drum support 12 and an inner bearing cap 40 is secured to a stationary support 50.

There are annular recesses 16 and 17 in the bearing caps 20 and 40 for admitting grease or other lubricant to the roller bearing 13. The bearing cap 20 is formed with a ledge 18 having an annular horizontal surface 19. A bearing spacer collar 21 is shrunk or otherwise secured to the shaft 11 and is provided with a smooth surface for co-operation with an annular grease check valve 22, having an L-shaped cross section.

As shown, the annular check valve 22 has a sleeve or cylindrical portion 23 which makes a loose fit with the journal 21 and an annular disc-shaped portion 24 having a lower face 25 adapted to rest upon the upper face 19 of the ledge 18. Preferably annular circular grooves 26 are formed in the face 25 in order to reduce the surface of contact between the faces 19 and 25, thereby reducing wear and frictional drag.

The stationary member 50 is formed with a passageway 27 having a grease inlet end 28 and an outlet end 29 in the recess 17 of a grease retaining cavity formed by recesses 16 and 17. For introducing grease, a conventional pressure fitting 30 is provided adapted for use with a grease gun or similar pressure device. However, any of the well-known means for introducing grease may be utilized. In order to avoid producing excessive grease pressure when grease is introduced, relief means are provided. This may take the form of a cavity 31 above the recess 15 for roller bearing 13, cooperating with a relief passageway 32 having an inlet end 33 in the relief cavity 31 and outlet end 34 at which any excess grease may be collected. An annular well 60 delivers grease from the passageway 32 to the outlet 34.

The arrangement is such that when the bearing 13 is to be lubricated, grease is admitted through the pressure fitting 30 traveling upward through the passageway 27 into the recess 17 of the grease retaining cavity, whereupon it lifts the check valve 22, traveling between the faces 19 and 25 of the ledge 18 and the check valve 22, respectively, into the recess 16 of the grease retaining passageway, whence it is supplied to the roller bearing 13. This operation takes place during the rotation of the shaft 11 since the check valve 22 fits loosely upon the shaft collar 21 and is free to rotate with it or to slide axially upward. However, as soon as the pressure of the inlet grease is relieved by removal of the pressure device at the fitting 30, gravity acting upon the check valve 22 and upon the grease in the portion 16 of the grease retaining cavity causes the check valve 22 to descend. The face 25 then rests upon the face 19 of the ledge preventing egress of grease from the cavity 16 and from the roller bearing 13. In this manner the bearing 13 is prevented from running dry or being left with inadequate lubrication.

Annular check valves of the type illustrated may also be used in conjunction with the lubrication of inaccessible bearings, such as pilot ball bearings 35 of the type illustrated in FIG. 2. In this case a long, vertically extending shaft 36, the mid portion of which is broken away to render the drawing more compact, extends upward to a cap 37 having a recess 38 in which the pilot ball bearing 35 is mounted. There is an outer ball race 39 secured to the cap 37 and an inner ball race 41 secured to the upper end of the shaft 36 with conventional anti-friction devices in the form of hardened balls 42.

The shaft 36 is formed with a central passageway 43, extending to the upper end of the shaft 36 and opening into the recess or grease cavity 38.

In conjunction with a bearing housing 44 at the lower end of the shaft 36, or intermediate ends thereof, grease supply means are provided, including a grease retaining cavity 45. The central passageway 43 through the shaft 36 is closed at the bottom end and extends substantially as far down as the grease retaining cavity, having one or more radial branches 46 communicating with the grease retaining cavity 45. At the lower boundary of the grease retaining cavity 45 a ledge or shelf 47 is formed in the housing 44, having a horizontal annular surface extending toward but clearing the outer surface of the shaft 36. There is a corresponding inverted ledge or shelf formed at the upper boundary of the grease retaining cavity 45, having a lower annular surface 48, extending toward and surrounding but not meeting the outer surface of the shaft 36. In order to permit assembly of the apparatus, separable bolted cap means 49 are provided having the annular surface 48 forming the upper boundary of the grease retaining cavity 45.

The housing 44 is formed with a grease inlet passageway 51 communicating with the grease cavity 45 and provided with the conventional means for admitting grease under pressure against the centrifugal force of grease acting in the passageway 46, such as the conventional pressure fitting 30.

In order to close the upper and lower boundaries of the grease retaining and supplying cavity 45 without introducing frictional drag to the rotation of the shaft 36, upper and lower grease check valves 52 and 53 are provided which close the space between the inner edges of the annular surfaces 48 and 47, respectively, and the outer surface of the shaft 36. The grease check valves 52 and 53 fit loosely on the shaft 36 and are annular, being similar in cross section if desired, to that of the check valve 22 illustrated in FIG. 1. In this case, however, snap ring means such as the snap ring 54 are provided for limiting movement of the check valves 52 and 53 away from their respective shoulder or ledge faces 48 and 47 when grease is relieved at the grease fitting 30.

As shown, the check valve 53 is annular in construction with a flat disc portion and a hollow cylindrical portion, similar to the construction of the check valve 22 of FIG. 1, but inverted. However, to facilitate closing of the radial passageways 46 in the shaft 36 at the shaft surface, the check valve 52 is annular with T-shaped cross-section instead of L-shaped cross section, with a hollow cylindrical portion 55 and a flat disc radially extending portion 56 joining the hollow cylindrical portion 55 midway of the ends thereof. The check valves 52 and 53, like the check valve 22 of FIG. 1, are formed with faces 57 and 58 adapted to bear against the faces 48 and 47 at the upper and lower ends of the grease cavity 45. Preferably, also, annular, circular grooves 26 are formed in the faces 57 and 58 to reduce wear and frictional drag while the cavity is under grease pressure.

When it is desired to lubricate the pilot bearing 35, grease is admitted through the fitting 30 under pressure and passes through the opening 51 into the grease cavity 45 radially inward through the radial passageway 46 and upward through the central passageway 43 of the shaft 36 to the cavity 38 and to the pilot bearing 35. The pressure of the grease as it is admitted to the cavity 45 forces the check valve 53 downward and the check valve 52 upward to close the clearances at the shelf or ledge surfaces 47 and 48. However, when the pressure is relieved by removal of the pressure device from the fitting 30, the check valve 52 is free to descend under the action of gravity, the lower limit of its motion being determined by the snap ring 54, when the check valve 52 reaches the position indicated by the dotted lines 59. In this position the outer end of the radial passageway 46 is closed and grease cannot escape from the shaft 36.

A lower and more accessible ball bearing 61 is also shown to complete the structure. However, it will be understood that the grease supply means to which the invention particularly appertains is for the inaccessible pilot bearing 35. When the pressure of grease entering the passageway 51 is relieved, the check valve 53 rides more lightly upon the face 47 and accordingly the frictional drag is substantially eliminated. The possibility of any upward movement to an extent which would preclude directing the grease from the passageway 51 into the radial passageway 46 is avoided by the presence of the snap ring 54.

Figure 3:
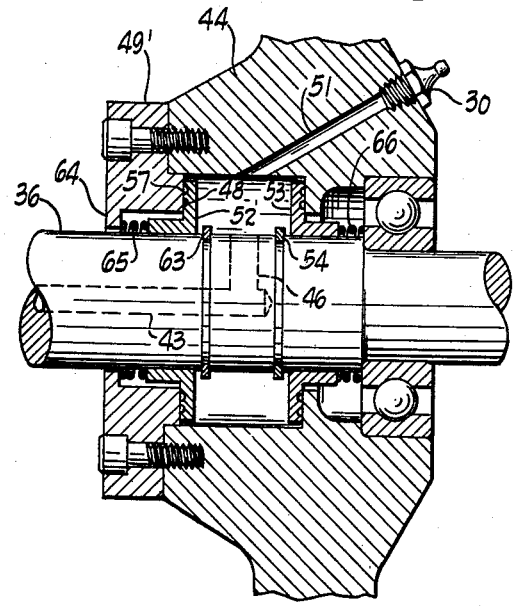
FIG. 3 is a fragmentary view of the modification of the arrangement of FIG. 2 adapted for horizontal drives.

If it is not desired to seal the outer end of the radial passageway 46 when the grease pressure is removed, the upper check valve 52 may also be of L-shaped cross-section with the lower portion 62 omitted, in which case a second snap ring, similar to the snap ring 54, is preferably provided at a position on the shaft 36 sufficiently below the portion 56 of the check valve 52 to permit the face 57 to drop slightly from the surface 48 to reduce wear and frictional drag without permitting the check valve 52 to drop so far that it will be ineffective in directing grease from the passageway 51 to the radial passageway 46 when grease pressure is again applied. Thus, the arrangement may be similar to that illustrated in FIG. 3 in which the construction of FIG. 2 is adapted to a horizontal drive having two snap rings 54 and 63 for limiting the motion of check valves 53 and 52', respectively.

In this case spring pressure instead of gravity may be employed to relieve the pressure between the faces 48 and 57 when pressure in the grease passageway 51 is removed. For example, a separable, bolted-on member 49' may be provided having an inwardly extending lip 64 cooperating with a helical compression spring 65 tending to move the check valve 52' toward the snap ring 63 when grease pressure is removed, but weak enough to be compressed as soon as grease is admitted through the passageway 51. A corresponding helical spring 66 may be provided for cooperation with the check valve 53.

On the other hand, if it is desired to prevent escape of grease from the radial passageway 46 in a horizontal drive, the snap ring 63 may be omitted and a double-shouldered check valve, such as the valve 52 of FIG. 2, may be employed, with the lightly loaded spring 65 then serving to move the portion 62 of the check valve into position for closing the outer end of the radial passageway 46 when grease pressure is removed from the passageway 51.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended therefore, to cover all such modifications and variations as fall within the scope of the invention.

Other modes of applying the principle of this invention may be employed instead of those specifically set forth above, changes being made as regards the details herein disclosed provided the elements set forth in any of the following claims, or the equivalent of such be employed.

It is, therefore, particularly pointed out and distinctly claimed as the invention:

1. A grease check valve comprising in combination with a bearing housing having a grease supply passageway with an outlet end, a journal having a vertical axis of rotation, and a bearing mounted in said housing for rotatably supporting the journal, the housing having a recess at the outlet end of said grease passageway to provide access to the bearing at one side thereof for grease, an annular collar of L-shaped cross-section loosely fitted on the journal in said recess with a circular face, and a ledge formed in said bearing housing between the outlet end of the grease passageway and the bearing, the said collar being axially movable in space between said ledge and said bearing, said collar being movable away from said ledge for admitting grease to the bearing when grease is injected into the passageway, and movable toward said ledge with the circular face resting on the ledge to seal the bearing and prevent loss of grease therefrom when grease is not being injected.

2. Apparatus as in claim 1, wherein the ledge has a surface confronted by the surface formed by the face of said collar and one of said surfaces has coaxial annular grooves formed therein reducing wear and friction.

3. In combination with a journal having a vertical axis of rotation, a bearing housing therefor, and a bearing mounted in said housing for rotatably receiving the journal, the housing being formed with an annular cavity to receive the bearing, said cavity extending below the bearing with an inwardly extending shelf lying along a horizontal plane in the cavity below the bearing, the housing being provided with a grease supply passageway terminating in an outlet in the cavity below said shelf and an annular collar loosely fitted on the journal in the cavity between the said shelf and the bearing with a horizontal face adapted to rest on the shelf for sealing the portion of the cavity below the bearing, whereby the injection of grease through said passageway lifts said collar for admitting grease to said portion of the cavity below the bearing and to the bearing, and the collar is adapted to drop back upon said shelf for sealing the bearing and preventing loss of grease therefrom.

4. The apparatus of claim 3 wherein the annular cavity extends above the bearing and a grease relief passageway is formed in said bearing housing having an inlet opening in said cavity above the bearing.

5. The apparatus of claim 3 wherein the grease sealing collar is in the form of an annulus of L-shaped cross-section to form a hollow cylindrical portion extending upward along and around the journal and a flat annular portion extending outward, the lower surface of which forms the face adapted to rest upon said ledge and has annular grooves therein.

6. In combination, a vertical shaft having a pilot bearing at the upper end thereof, the shaft being formed with a central passageway for a supply of grease to said pilot bearing, radial passageway means in said shaft communicating with said central passageway, a housing surrounding the portion of the shaft including said radial passageway means, said housing being spaced from the shaft having inwardly extending walls transverse to the shaft for defining a grease admission space and a pair of collars loosely fitted on the shaft having faces adapted to lie along said transverse walls for sealing grease in said grease admission space, the housing having a grease admission passageway terminating in said grease admission space, one of said collars being movable sufficiently along the axis of said shaft for closing the radial passageway means in said shaft upon release of pressure from grease in the grease admission passageway for preventing loss of grease from said pilot bearing.

7. In combination, a shaft having a pilot bearing at the end thereof, the shaft being formed with a central passageway for supply of grease to said pilot bearing, radial passageway means in said shaft communicating with said central passageway, a housing surrounding the portion of the shaft including said radial passageway means, said housing being spaced from the shaft, having inwardly extending walls transverse to the shaft for defining a grease admission space and a pair of collars loosely fitted on the shaft having faces adapted to lie along said transverse walls for sealing grease in said grease admission space, the housing having a grease admission passageway terminating in said grease admission space.

8. In a vertical shaft assembly, a pair of relatively rotatable members, one of said members having a grease admission passageway, said relatively rotatable members having confronting surfaces, one of which has a recessed portion, said grease admission passageway terminating in the recessed portion for admitting grease thereto and axially movable sealing means in said recessed portion comprising a sealing surface adapted to be lifted for admitting grease through the grease passageway and to drop when the supply of grease is terminated in order to retain grease in the assembly.

9. In combination, a pair of relatively rotatable members, having an axis of relative rotation, one member surrounding the other, one being recessed to form a grease transmitting cavity, one of said members having a grease transmitting passageway therein with an opening to said cavity, said cavity having a boundary surface transverse to the axis of relative rotation and extending toward the other member but spaced therefrom to provide clearance space between the relatively rotatable members, and annular sealing means axially slidable in said cavity between positions against and spaced from said boundary surface for sealing said clearance space when the sealing means is against said boundary surface.

10. In combination a shaft with a surrounding housing having a cavity therein with an end boundary defining a grease cavity, said shaft and housing constituting relatively rotatable members, one of said relatively rotatable members having a grease admission passageway communicating with said grease cavity, a bearing receiving grease therefrom surrounding the shaft, and an annular check valve loosely fitting the shaft having a face movable against said grease cavity end boundary for sealing the shaft to said end boundary of the grease cavity.

11. Apparatus as in claim 10 in which the check valve is biased for axial movement against the pressure of grease in the cavity.

References Cited in the file of this patent
UNITED STATES PATENTS

| | | |
|---|---|---|
| 2,309,985 | Ruist | Feb. 2, 1943 |
| 2,611,450 | Kalikow | Sept. 23, 1952 |